July 7, 1953 A. W. LO 2,644,896

TRANSISTOR BISTABLE CIRCUIT

Filed July 29, 1952

INVENTOR.

Arthur W. Lo

BY H. D. Muston

ATTORNEY

Patented July 7, 1953 2,644,896

UNITED STATES PATENT OFFICE 2,644,896

TRANSISTOR BISTABLE CIRCUIT

Arthur W. Lo, Haddonfield, N. J., assignor to Radio Corporation of America, a corporation of Delaware Application July 29, 1952, Serial No. 301,557

9 Claims. (Cl. 307—88)

This invention relates generally to triggered circuits, and particularly relates to a bistable transistor circuit employing a single current-multiplication transistor.

Various transistor circuits are known which employ a single current-multiplication transistor to provide, for example, bistable triggered circuits. Such a circuit has been disclosed and claimed in the patent to Eberhard 2,533,001. The patent to Rack 2,579,336 discloses and claims a stabilized transistor triggered circuit which may be operated so as to have two stable states of operation.

The latter patent indicates that available transistors exhibit considerable differences in their characteristics such, for example, as the emitter current vs. emitter voltage characteristic. Consequently, many of the prior art transistor triggered circuits require adjustment of the circuit constants to compensate for the different characteristics of each individual transistor. The bistable operation of a single transistor triggered circuit depends on the negative resistance characteristic which appears looking into the emitter. The emitter characteristic contains a negative resistance portion bounded at either end by a positive resistance portion. In order to obtain a circuit having two stable states of operation, it is necessary to provide a resistor load in the emitter circuit which may be represented as a load line intersecting the emitter characteristic once in each region, that is, three times.

Consequently, in order to operate transistors of widely varying characteristics so as to provide two stable states of current conditions the circuit parameters must usually be selected so that the individual emitter current vs. emitter voltage curves match each other as closely as possible. The external emitter resistance must be chosen to obtain a load line intersecting the characteristic at three points. The load line may be shifted without changing its slope by providing a suitable emitter bias voltage. From these considerations it will be obvious that the external emitter resistance must be smaller than the greatest slope of the negative portion of the emitter characteristic and that the emitter bias voltage must also be properly selected. Hence, normally the external emitter resistance must be small and the value of the emitter bias voltage is critical. Frequently, it is desired to impress the trigger pulse on the emitter and to that end, the emitter circuit should present a high impedance rather than a low impedance.

The Rack circuit is intended to overcome some of the defects of prior art bistable transistor circuits. By providing substantially zero impedance in the external base circuit during the low current conduction state, the emitter current-emitter voltage curve is caused to pass through the origin of the coordinates. However, this circuit is comparatively complicated and may still require adjustment of the circuit parameters to compensate for the differences of the characteristics of individual transistors.

It is accordingly an object of the present invention to provide a bistable transistor triggered circuit employing a single current-multiplication transistor which is highly reliable in operation.

A further object of the invention is to provide a bistable transistor circuit of the type referred to which will operate with fixed circuit constants regardless of differences of the characteristics of individual transistors used therein.

Another object of the invention is to provide a bistable transistor circuit which is non-critical as to the power supply voltages and which effectively provides a high impedance in the emitter circuit so that trigger pulses may readily be impressed on the emitter.

The bistable circuit of the present invention includes a current-multiplication transistor, that is, a transistor where the collector current increments are larger than corresponding emitter current increments. An external network interconnects the transistor electrodes with a common junction point such as ground and includes a base impedance element and a collector impedance element which serves as the output load. The base impedance element may be a resistor and provides for regeneration as explained in the Eberhard patent referred to.

In accordance with the present invention, the emitter is connected to the common junction point through a non-linear resistance device such, for example, as a rectifier. The rectifier is poled in such a manner that it is biased in the non-conducting direction when the circuit is in its state of low current conduction and is biased in the conducting direction when the circuit is in its state of high current conduction. Consequently, a load line, representing an operation characteristic in a graph, approaches infinity for the state of low current conduction and assumes a small positive value for the high current conduction state. Thus, it is made possible that the load line may intersect practically any transistor characteristic at three points, to assure bistable operation.

Preferably, the emitter bias is provided by applying a voltage to the base so that the load line, in the graph referred to, intersects the origin of the coordinates of the emitter characteristic.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Figure 1:
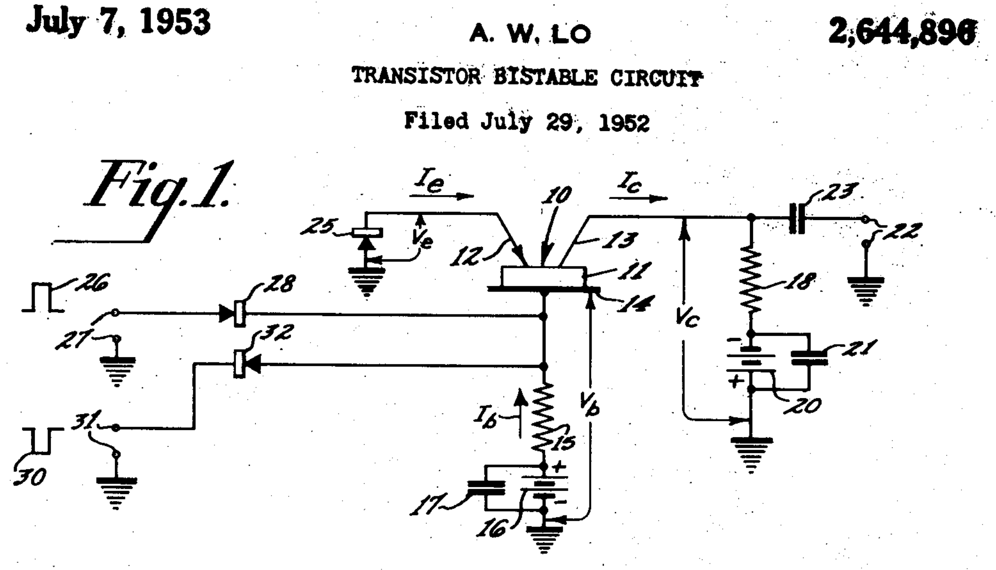
Figure 1 is a circuit diagram of a bistable transistor triggered circuit embodying the present invention.

Referring now to the drawing in which like elements are designated by the same reference characters throughout the figures, and particularly to Figure 1, there is illustrated a bistable triggered circuit including a transistor 10. Transistor 10 should be a current-multiplication transistor and may, for example, be a point contact transistor, that is, a transistor of the type where the emitter and collector electrodes are both in rectifying contact with the semi-conducting body 11. The body 11 may consist of a semi-conducting material such as germanium and preferably is of the N type as will be assumed in the following discussion. Emitter 12, collector 13 and base 14 are in contact with body 11. The details of manufacture and the mode of operation of a point contact transistor are well known and need not be further described here.

Base resistor 15 is connected between base 14 and a source of voltage such as battery 16 having its negative terminal grounded. Battery 16 may be bypassed for alternating currents by bypass capacitor 17. Collector resistor 18 is connected between collector 13 and another suitable source of voltage such as battery 20 having its positive terminal grounded. Battery 20 may also be bypassed for alternating current by capacitor 21. Battery 20 is poled to apply a bias voltage in the reverse direction between collector 13 and base 14, while battery 16 is poled to apply a bias voltage in the forward direction between emitter 12 and base 14.

An output signal may be derived across collector resistor 18. To this end, a pair of output terminals 22 is provided, one of which is grounded, while the other one is coupled through coupling capacitor 23 to collector 13.

The transistor circuit described so far is conventional. In accordance with the present invention, the emitter 12 is grounded through a non-linear resistance device such as rectifier 25 which may, for example, be a crystal rectifier as shown. Rectifier 25 should be poled in such a manner that it is nonconducting when emitter 12 is positive with respect to ground, which occurs during the low conduction state of the circuit.

As will be more fully explained hereinafter, the circuit may, for example, be triggered by applying trigger pulses of alternately opposite polarity to the base 14. To this end, a positive trigger pulse illustrated at 26 may be applied to input terminals 27, one of which is connected to base 14 through a crystal rectifier 28. Rectifier 28 is poled to become conducting upon the arrival of a positive trigger pulse 26. A succeeding negative trigger pulse shown at 30 is applied to input terminals 31, one of which is connected to base 14 through crystal rectifier 32. Rectifier 32 is poled to become conducting upon the arrival of a negative trigger pulse 30.

Figures 2, 3:
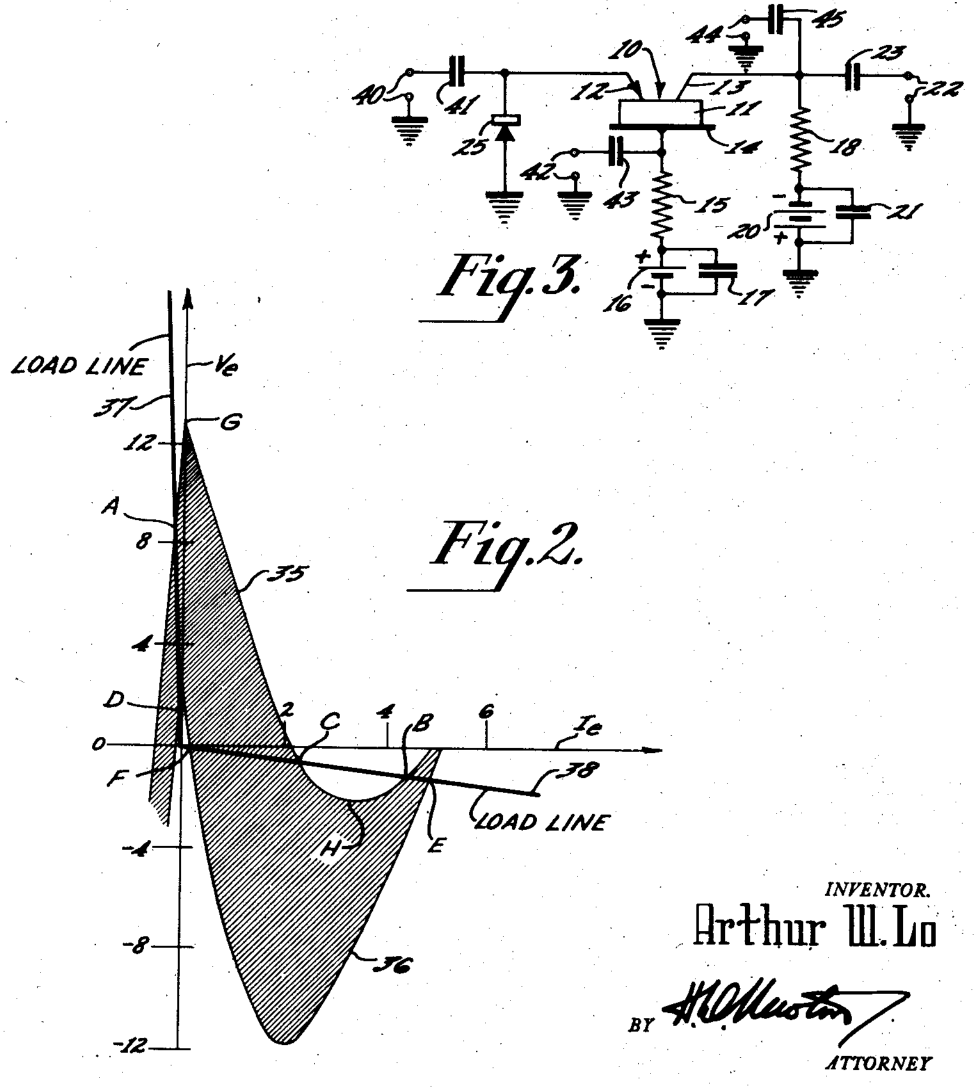
Figure 2 is a graph illustrating the emitter voltage plotted as a function of the emitter current.
Figure 3 is a circuit diagram of a modified triggered circuit in accordance with the invention.

The operation of the bistable circuit of Figure 1 will now be explained in connection with Figure 2. Curve 35 of Figure 2 illustrates a representative characteristic of a transistor and shows the emitter voltage $V_e$ plotted as a function of the emitter current $I_e$ both of which have been indicated in Figure 1. A study of a number of representative transistors has revealed that their characteristics generally fall into the shaded area contained between curves 35 and 36. Consequently, in order to obtain bistable operation it is necessary to provide a load line which will intersect either curve 35 or curve 36 at three points.

In accordance with the present invention, the load line is represented by the straight lines 37 and 38. Line 37 represents a very high resistance, which is determined by that of rectifier 25 when biased in the non-conducting direction. On the other hand, line 38 represents a very low resistance, which is determined by the resistance of rectifier 25 when biased in the conducting direction. It will now be seen that load line 37, 38 intersects curve 35 at points A and B, which represent stable operation as well as at point C representing an unstable point of operation. The same load line 37, 38 intersects curve 36 at the stable points D and E and at the unstable point F. Hence, it will be obvious that for any transistor, whose characteristic falls between curves 35 and 36, bistable operation may be obtained by means of the load line 37, 38.

Let it be assumed, for example, that the transistor circuit of Figure 1 is in its stable state of low current conduction. Let it further be assumed that its characteristic is represented by curve 35. The stable low-current operation is determined by point A. In order to trigger the circuit into its other stable state of high current conduction, it is necessary to apply a positive trigger pulse to the emitter, which must be of sufficient amplitude to carry the circuit beyond the point G. Instead of applying a positive pulse to the emitter, it is feasible to apply a negative trigger pulse such as shown at 30 to base 14 or to apply a negative trigger pulse to collector 13. As soon as the emitter voltage or current passes beyond the point G, the circuit will snap over to its other stable point B.

It may be noted from Figure 2 that during the state of low current conduction the emitter voltage $V_e$ is positive with respect to ground. However, on the other hand, due to the small collector current which flows at that time, the base voltage $V_b$ is still more positive with respect to ground so that the emitter voltage is actually negative with respect to that of the base. Consequently, during the state of low current conduction, rectifier 25 is biased in the non-conducting direction.

During the state of high current conduction corresponding to point B on curve 35 the emitter voltage $V_e$ becomes negative with respect to ground so that rectifier 25 is biased in the conducting direction. At the same time, due to the large collector current flow, the base voltage $V_b$ has a larger negative value so that the emitter has a positive voltage with respect to the base.

The circuit of Figure 1 may be triggered back into its state of low current conduction by the application of a negative pulse to the emitter. Alternatively, a positive pulse such as pulse 26 may be applied to the base or a positive pulse may be applied to the collector. The trigger pulse must have such an amplitude that it will trigger the circuit past point H representing the minimum of curve 35 whereupon the circuit snaps back to its starting point A. The circuit can then be triggered again into its state of high current conduction either by applying a positive pulse to emitter 12 or a negative pulse to the base 14. The operation of the circuit is exactly the same as described herein when the transistor characteristic corresponds to curve 36 instead of to curve 35.

While it will be understood that the circuit specifications of the bistable triggered circuit of the invention may vary according to the design for any particular application, the following circuit specifications for the circuit of Figure 1 are included by way of example only:

| | | |
|---|---|---|
| Base resistor 15 | ohms | 18,000 |
| Collector resistor 18 | do | 5,600 |
| Battery 16 | volts | +45 |
| Battery 20 | do | −45 |

Representative values of the emitter current $I_e$, collector current $I_c$, base current $I_b$, emitter voltage $V_e$, collector voltage $V_c$ and base voltage $V_b$ (as indicated in Figure 1) are given below for both the low current conduction state and the high current conduction state.

| | High Current Conduction State | Low Current Conduction State |
|---|---|---|
| Emitter current $I_e$ ... ma | +5.2 | −0.01 |
| Collector current $I_c$ ... ma | −7.8 | −2.1 |
| Base current $I_b$ ... ma | +2.4 | +2.0 |
| Emitter Voltage $V_e$ ... volts | −1.0 | +3.6 |
| Collector Voltage $V_c$ ... do | −2.8 | −33.0 |
| Base Voltage $V_b$ ... do | −1.5 | +5.5 |
| Collector-to-Base Dissipation ... mw | 14 | 70 |
| Emitter-to-Base Dissipation ... mw | 1 | 0 |
| Collector Power Supply ... mw | 350 | 90 |
| Base Power Supply ... mw | 110 | 90 |

Instead of applying alternately positive and negative pulses to one of the electrodes of the transistor, it is also feasible to apply pulses of the same polarity alternately to different electrodes. This will now be explained in connection with Figure 3. To this end, input terminals 40 may be provided, one of which is grounded, while the other one is coupled to emitter 12 through coupling capacitor 41. Another pair of input terminals 42 may be provided, one of which is grounded, while the other one is coupled through capacitor 43 to base 14. Finally, input terminals 44 may be provided, one of which is grounded, while the other one is coupled to collector 13 through coupling capacitor 45.

As explained hereinbefore, a positive pulse applied through terminals 40 to emitter 12 will trigger the circuit of the invention from the state of low current conduction to the state of high current conduction. If a succeeding trigger pulse of positive polarity is applied to input terminals 42, a positive pulse is applied to base 14 which will trigger the circuit from a state of high current conduction to a state of low current conduction. The same result is obtained if a positive trigger pulse is applied through input terminals 44 to collector 13.

On the other hand, it is also feasible to apply a negative trigger pulse to emitter 12. As previously explained, this will trigger the circuit from a high current conduction state to a low current conduction state. A succeeding trigger pulse of negative polarity applied to base 14 or to collector 13 will then trigger the circuit from low current conduction to high current conduction. Hence, the circuit of the invention may be triggered either by applying trigger pulses of alternately opposite polarity to the same electrode or by steering pulses of the same polarity in succession to different electrodes.

There has thus been disclosed a transistor bistable circuit which may be triggered from one state of stable operation to the other by means of trigger pulses. The circuit is substantially insensitive to variations of the supply voltages and may be operated with fixed circuit parameters in spite of widely varying characteristics of individual transistors. The circuit of the invention is extremely simple and reliable in operation.

What is claimed is:

1. A bistable triggered circuit comprising a current-multiplication transistor including a semi-conducting body, a base electrode, an emitter electrode and a collector electrode in contact with said body, an external circuit network interconnecting said electrodes with a common junction joint and including a first impedance element connected between said base electrode and said junction point, an output second impedance element connected between said collector electrode and said junction point, means serially connected with said first and second impedance elements for applying a bias voltage in the reverse direction between said collector and base electrodes, a non-linear resistance device connected between said emitter electrode and said junction point, and means connected between said emitter and collector electrodes for applying a bias voltage in the forward direction between said emitter and base electrodes, said circuit thereby having a stable state of low current conduction and another stable state of high current conduction, and said device being connected so as to have a relatively high resistance while said circuit is in said state of low current conduction and to have a relatively low resistance while said circuit is in said state of high current conduction.

2. A triggered circuit as defined in claim 1 wherein said first impedance element is a resistor.

3. A triggered circuit as defined in claim 1 wherein said output second impedance element is a resistor.

4. A triggered circuit as defined in claim 1 wherein means is provided for applying trigger pulses to at least one of said electrodes.

5. A triggered circuit as defined in claim 1 wherein said non-linear resistance device is a rectifier.

6. A bistable triggered circuit comprising a current-multiplication transistor including a semi-conducting body, a base electrode, an emitter electrode and a collector electrode in contact with said body, an external network interconnecting said electrodes with a junction point and including a resistor connected between said base electrode and said junction point, an output impedance element connected between said collector electrode and said junction point, a first source of voltage serially connected with said impedance element between said collector electrode and said junction point for applying a bias voltage in the reverse direction between said collector and base electrodes, a second source of voltage serially connected with said resistor between said base electrode and said junction point for applying a bias voltage in the forward direction between said emitter and base electrodes, a rectifier connected between said emitter electrode and said junction point, said circuit thereby having a stable state of low current conduction and another stable state of high current conduction, said rectifier being poled so as to be non-conducting when said circuit is in said stable state of low current conduction and so as to be conducting when said circuit is in said stable state of high current conduction, and a pair of output terminals coupled across said impedance element.

7. A triggered circuit as defined in claim 6 wherein said rectifier is a crystal rectifier.

8. A triggered circuit as defined in claim 6 wherein means are provided to apply trigger pulses of alternately opposite polarity to one of said electrodes.

9. A triggered circuit as defined in claim 6 wherein means are provided to apply trigger pulses of the same polarity alternately to two different ones of said electrodes.

ARTHUR W. LO.

No references cited.